United States Patent [19]

Haikawa et al.

[11] Patent Number: 5,544,211
[45] Date of Patent: Aug. 6, 1996

[54] NUCLEAR FUEL ASSEMBLY AND NUCLEAR REACTOR INCORPORATING THE SAME

[75] Inventors: Katsumasa Haikawa, Ibaraki-ken; Takaaki Mochida, Hitachi; Mamoru Nagano; Tsuyoshi Nakajima, both of Yokohama, all of Japan

[73] Assignees: Hitachi, Ltd., Tokyo; Kabushiki Kaisha Toshiba, Kanagawa-ken, both of Japan; General Electric Company, Schenectady, N.Y.

[21] Appl. No.: 321,618

[22] Filed: Oct. 12, 1994

[30] Foreign Application Priority Data

Oct. 12, 1993 [JP] Japan .................................. 5-254029

[51] Int. Cl.⁶ .................................................. G21C 3/32
[52] U.S. Cl. .................. 376/435; 376/419; 376/267; 376/349; 376/428; 376/444; 376/443
[58] Field of Search ......................... 376/435, 419, 376/267, 349, 428, 444, 443; 976/DIG. 60, DIG. 64

[56] References Cited

U.S. PATENT DOCUMENTS

| 4,876,063 | 10/1989 | Johansson | 376/444 |
|---|---|---|---|
| 5,198,186 | 3/1993 | Ogiya et al. | 376/435 |
| 5,367,547 | 11/1994 | Hida et al. | 376/435 |
| 5,377,247 | 12/1994 | Yoshioka et al. | 376/428 |

Primary Examiner—Charles T. Jordan
Assistant Examiner—Meena Chelliah
Attorney, Agent, or Firm—Antonelli, Terry, Stout & Kraus

[57] ABSTRACT

A fuel assembly has part length and full length fuel rods, and a pair of large-diameter water rods which occupy an area which can accommodate 7 fuel rods. Natural uranium regions are provided in the upper and lower end portions of the effective fuel zone of the fuel assembly. An intermediate region between these upper and lower natural uranium regions provides an enriched uranium region which has three axial sections: an upper section, a middle section and a lower section. The middle section has the highest average enrichment, the lower section has the medium average enrichment and the upper section has the smallest average enrichment. The difference in the average enrichment between the middle section and the lower section is smaller than that between the middle section and the upper section. The upper section has a lower concentration of burnable poison than other sections of the enriched uranium region. According to this arrangement, a greater burn-up degree of the fuel assembly can be achieved with minimal increment of the average enrichment, while preserving sufficiently large safety margin such as the thermal margin of the reactor and the reactor cold shut down margin.

16 Claims, 9 Drawing Sheets

| □ 1 | FRESH FUEL ASS'Y WITH FEWER BURNABLE-POISON-CONTAINING RODS |
| --- | --- |
| ⓛ | FRESH FUEL ASS'Y WITH MORE BURNABLE-POISON-CONTAINING RODS |
| □ n | FUEL GOING TO EXPERIENCE n-TH CYCLE |
| □ | CONTROL CELL |

NUCLEAR FUEL ASSEMBLY AND NUCLEAR REACTOR INCORPORATING THE SAME

BACKGROUND OF THE INVENTION

1. Field of the Invention

The present invention relates to a nuclear fuel assembly for use in a boiling water nuclear reactor (referred tonn as "BWR" hereinafter) and a BWR having a core loaded with such a nuclear fuel assembly.

2. Description of the Related Art

Improvement in nuclear power station economy can effectively be achieved by a reduction in the fuel cycle cost through enhancement of the fuel exposure.

It would be possible to enhance the exposure simply by increasing enrichment of conventional fuel. The increase in the enrichment, however, causes hardening of neutron spectrum, resulting in occurrence of phenomena such as (a) increase in the absolute value of the void coefficient, (b) increase in the reactivity in the core in cold state, (c) reduction in ability to control the reaction by burnable poison such as gadolinia. Such phenomenon may undesirably lead to reduction in thermal margin and shut-down margin of the nuclear reactor. Enhancement of exposure merely by increase in the enrichment is inevitably accompanied by increase in the cost of natural uranium per fuel, as well as in the cost incurred in the course of enriching of the fuel, so that the effect in reducing the fuel cycle cost achieved through fuel enrichment is diminished.

This problem is dealt with in BWRs by softening neutron spectrum through increasing water-to-fuel ratio. More specifically, it is effective to increase the water region of water rods in a fuel assembly. Increase in the water region of water rod in the center of a fuel assembly having fuel rods arranged in 8 rows and 8 columns (referred to as "8×8 fuel assembly" hereinafter) can be realized only at the cost of decrease in the fuel rods, resulting in a reduced thermal margin. Furthermore, degree of freedom in the nuclear design is disadvantageously reduced due to, for example, restriction in the arrangement design of gadolinia-containing fuel, because the number of fuel rods per assembly is decreased. Fuel assemblies improved to achieve higher fuel economy have been proposed in, for example, Japanese Patent Publication No. 3-78954 and U.S. Pat. No. 5,198,186. These fuel assemblies employ water rods of different cross-sectional shapes, but has a common feature in that each fuel rod has upper and lower end regions of natural uranium, and an enriched uranium region between these natural uranium regions, the enriched uranium region having upper, middle and lower sections, the upper and lower sections having average enrichments across horizontal cross-section which are equal to each other and lower than that of the middle section, the content of burnable poison per unit axial length being lower in the upper section than in other sections of the enriched uranium region. For instance, U.S. Pat. No. 5,198,186 discloses a fuel assembly in which an area where four fuel rods can be disposed is occupied by a single water rod of an increased diameter.

The fuel assembly disclosed in U.S. Pat. No. 5,198,186 exhibits an average discharge exposure of 38 GWd/t. An attempt to further enhance the exposure through increase in the average enrichment in this fuel assembly is encountered with a problem in that the thermal margin is reduced due to increase in the area of the water region of the water rod at the center of the nuclear fuel assembly.

SUMMARY OF THE INVENTION

Accordingly, an object of the present invention is to provide a fuel assembly, as well as a nuclear reactor incorporating the same, which can enhance fuel exposure by a comparatively low increase in the average enrichment.

To this end, according to the present invention, this is provided a nuclear fuel assembly having a plurality of fuel rods charged with a nuclear fuel material, and at least one water rod surrounded by the fuel rods, comprising: a fuel-charged zone including axially upper and lower end regions charge with natural uranium, and enriched uranium region between the upper and lower end regions, the enriched uranium region having an upper section, a middle section and a lower section of different levels of enrichment;

the middle section having average enrichment of a level higher than those of the upper and lower sections; the difference in the average enrichment level between the middle section and the lower section being smaller than that between the middle section and the upper section; the burnable poison content per unit axial length in the upper section being smaller than those in other sections of the enriched uranium region.

According to the invention, axial power distribution is rendered uniform by virtue of the fact that the average enrichment is greater in the middle section than in the lower section of the enriched uranium region. It is to be understood, however, that the peak of axial power distribution appears rather at a lower portion where the neutron moderation effect is large, due to the fact that the difference in the average enrichment between the middle section and the lower section is smaller than that between the middle section and the upper section.

This leads to improvement in the neutron utilization factor in the lower section to provide an enhanced reactivity in this section, so as to suppress deterioration in the performance of the reactor core. It is impossible to enhance the exposure without requiring substantial increase in the average enrichment.

The above and other objects, features and advantages of the present invention will become clear from the following description when the same is read in conjunction with the accompanying drawings.

DESCRIPTION OF THE PREFERRED EMBODIMENTS

Preferred embodiments of the present invention will be described with reference to the accompanying drawings.

A fuel assembly embodying the present invention has fuel rods arranged in a matrix-like pattern composed of 9 rows and 9 columns (referred to as "9×9 arrangement", hereinafter). This fuel assembly exhibits reduced average linear power distribution to provide required thermal margin. A mere increase in the number of fuel rods, however, poses various problems such as impairment of the thermal-hydraulic stability due to increase in the pressure loss in the reactor core. In order to overcome this problem, fuel rods having different axial lengths are used so as to suppress increase in the pressure loss.

The present invention features a combined use of at least one large-diameter water rod which provides an increased cross-sectional area of water region and part length fuel rods having a comparatively low axial length. By virtue of this feature, it is possible to preserve safety margin of reactor performance such as thermal margin and shut down margin. In addition, power peaking such a local power peaking coefficient of the fuel assembly can be increased so as to further improve fuel economy, thanks to the reduction in the average linear power density.

In order to achieve high fuel economy, the fuel assembly embodying the present invention offers: (A) efficient use of the power peaking, (B) reduction in the amount of residual burnable poison, and (C) improvement in water-to-fuel ratio. The efficient use of the power peaking means to increase the ratio of use of thermal neutrons by determining the distribution of fissile material, e.g. U-235, in relation to the neutron flux density in the fuel assembly such that the content of the fissile material is high in the region where the neutron flux density is high, and low in the region where the neutron flux density is low. As a consequence, the power peaking is increased and, at the same time, the reactivity of the reactor core increases.

The reduction in the amount of residual burnable poison is to set the concentration of burnable poison, e.g., gadolinia, in the lower end region and in the upper end region of the reactor core where burning of the poison is slow due to high void fraction and high hardness of the neutron spectrum, thereby minimizing loss of reactivity attributable to presence of residual burnable poison.

The improvement in the water-to-fuel ratio is intended to increase the ratio of water to the fuel so as to increase the ratio of use of the thermal neutrons thereby to enhance the reactivity in the reactor core.

According to the invention, an enhanced exposure can be achieved with minimal increase in the enrichment, by adopting the above-described features (A) to (C).

A description will now be given of outline of the fuel assembly of the invention, as well as the outline of the nuclear reactor of the invention, which adopts these improvement measures.

I. Fuel Assembly of the Invention

Figure 1A:
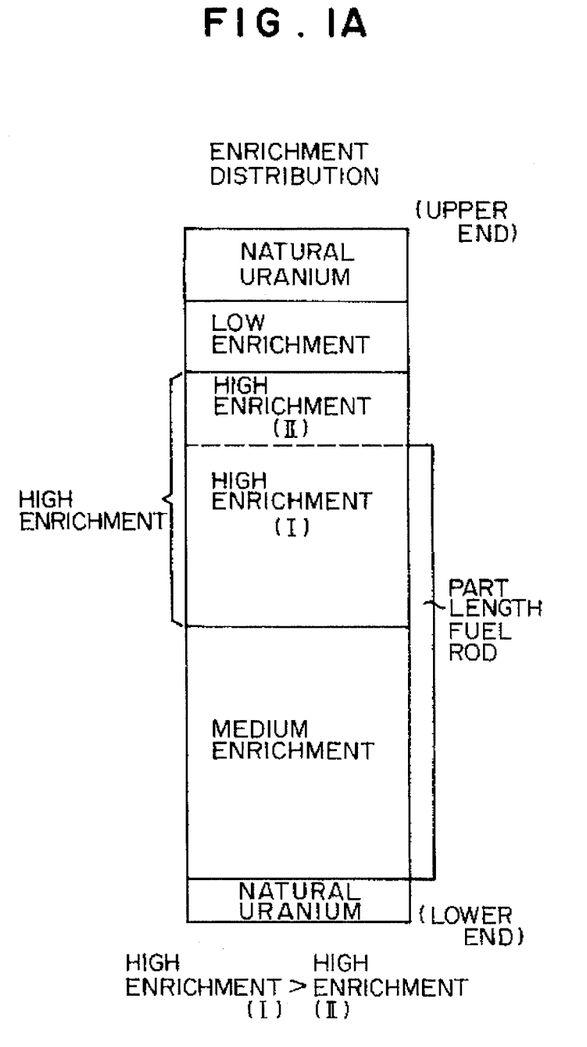
FIGS. 1A and 1B are diagrams schematically illustrating enrichment distribution and gadolinia content distribution in a fuel assembly of the present invention.
Figure 1B:
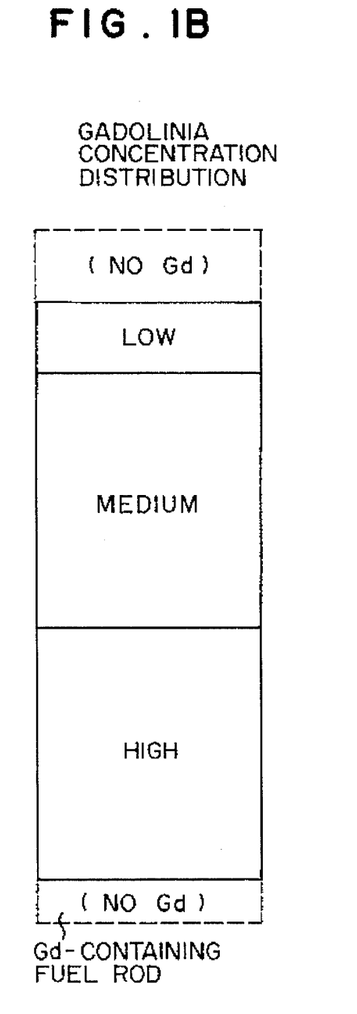

The fuel assembly of the present invention has the following basic features. In particular, the fuel assembly has an axial enrichment distribution an axial distribution of concentration of Gd as the burnable poison as shown in FIGS. 1A and 1B, respectively.

(1) Large-diameter water rod

Figure 3:
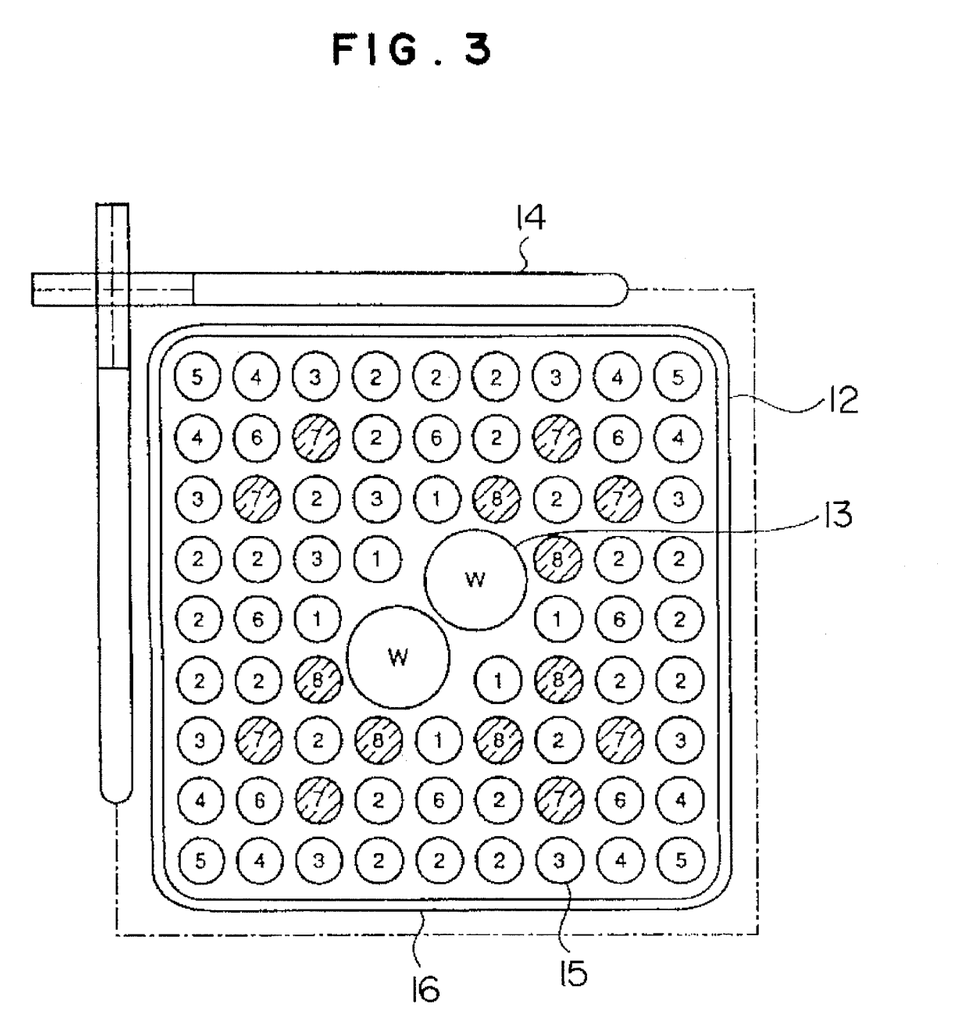
FIG. 3 is a cross-sectional view of the fuel assembly shown in FIG. 2.

As shown in FIG. 3, a fuel assembly embodying the present invention has a pair of water rods W which are arranged along a diagonal line of the cross-section of the fuel assembly. Each water rod has an outside diameter greater than the pitch of arrangement of the fuel rods. More specifically, the water rod W occupies an area which can accommodate 3-and-a-half fuel rods. Thus, these water rods W occupy an area corresponding to 7 fuel rods. The water rod W circulates non-boiling water.

In the fuel assembly of the invention which incorporates two such water rods, the water-to-fuel ratio is increased as compared with the conventional fuel assemblies, so that the neutron spectrum is softened to suppress the aforesaid undesirable effects: (a) increase in the absolute value of the void coefficient, (b) increase in the core reactivity in cold state and (c) reduction in the ability of burnable poison to control the reaction. In addition, the reactivity of the fuel assembly can be increased because of the water-to-fuel ratio which is increased as compared with those in conventional fuel assemblies.

(2) Part Length rods

A mere increase in the number of fuel rods causes an increase in the length of the wet edge contacting the coolant and, hence, resistance due to friction, so that the pressure loss is increased particularly in the gas-liquid two-layer flow portion in the fuel assembly, particularly at upper part of the fuel assembly, resulting in problems such as reduction in the thermal hydraulic stability which leads to increase in the moderation ratio. In view of this problem, the fuel assembly of the present invention has two type of fuel rods having different lengths of fuel-charged zones: namely, first fuel rods each having a fuel-charged zone of a length equal to the axial overall length of fuel-charged zone of the fuel assembly (referred to as "effective fuel length", hereinafter), and second fuel rods each having a fuel-charged zone of a length smaller than the effective fuel length H. The first and second fuel rods therefore will be referred also to a "long" and "short" fuel rods. The long and part length fuel rods have different axial lengths. The fuel-charged zone will be referred to as "effective fuel zone", hereinafter. The use of the part length fuel rods realizes such an arrangement that the number of the fuel rods in the cross-section of the fuel assembly is smaller in upper part of the fuel assembly than in lower part of the same, thus contributing to reduction in the flow resistance in the gas-liquid two-phase flow region. The fuel assembly of the invention of this application has eight part length fuel rods. The axial length of the effective fuel zone in the part length fuel rod is $14/24$ of the effective fuel length H. The effective fuel zone of the part length fuel rod extends from a position which is $1/24$ of the effective fuel length H to a position which is at $15/24$ of the effective fuel length H as measured from the bottom of the effective fuel zone of the fuel assembly.

In general, a BWR exhibits such characteristic that the axial distribution of the power is rendered even to some extent during power generation in which voids exist but a peak of axial power generation appears in cold state in which no void exists. Therefore, the reduction in the number of the fuel rods in the upper part of the fuel assembly, which increases the water-to-fuel ratio in the upper part of the fuel assembly where the neutron importance is high in cold state of the reactor, serves to further enhance the excessive moderation of neutrons so as to reduce the reactivity. Thus, the use of the part length fuel rods also produces an effect to increase the reactor shut down margin.

(3) Axial distribution of enrichment

In general, the neutron flux densities are low at upper and lower end portions than at the middle portion of the reactor. Therefore, the upper and lower end portions of the reactor core is charged with natural uranium, while the middle portion is enriched with the uranium. With this arrangement, it is possible to decrease leakage of neutrons to the upper and lower end portions, while enhancing the ratio of use of thermal neutrons, thereby increasing reactivity at the reactor core.

The fuel assembly embodying the present invention has an axial enrichment distribution as shown in FIG. 1A. It will be seen that the upper and lower end regions of the effective fuel zone are charged with natural uranium, while the region intermediate between these natural uranium regions is charged with enriched uranium. The enriched uranium region has three axial section, namely, upper, middle and lower sections having different levels of average enrichment. The upper end of the effective fuel zone of the part length fuel rod is positioned within the middle section of the effective fuel zone of the fuel assembly.

Figure 8:
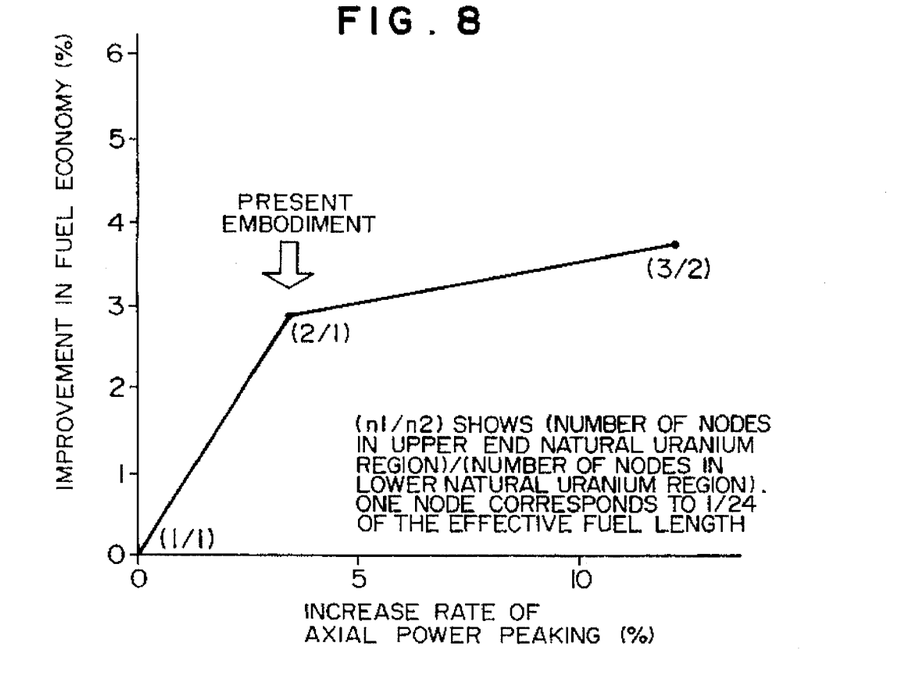
FIG. 8 is a diagram showing rate of increase in the power peaking and fuel economy improving effect in relation to the axial length of the natural uranium blanket.

A description will now be given of the axial lengths of the natural uranium regions which are the upper and lower regions of the fuel assembly. FIG. 8 illustrates the relationship between the rate of increase in the power peaking in the lower axial portion and the rate of improvement in the fuel economy, using, as a parameter, the axial length of the natural uranium regions which are the upper and lower end regions. The axial length is expressed in terms of the number of nodes, wherein one node corresponds to $1/24$ of the effective fuel length H. An increase in the axial length of the natural uranium region in one hand improves fuel economy but on the other hand enhances the power peaking along the axis. It is necessary to decrease the number of nodes of the natural uranium region when it is desired to suppress the power peaking along the axis. The axial power peaking in terms of combination of radial and local peaking must be such that the linear power generation ratio does not exceed an operational limit value. In addition, there is a tendency that the effect of improving fuel economy is saturated when the above-mentioned parameters changed from (2/1) to (3/2). For these reasons, in the fuel assembly embodying the present invention, the upper end regions of a length corresponding to two nodes, extending downward from the top end of the effective fuel zone, and the lower end region of a length corresponding to one node, extending upward from the bottom end of the effective fuel zone, are used as the natural uranium regions. As stated above, the effective fuel length H corresponds to 24 nodes. In each value of the parameter, the numerator and the denominator in parenthesis ( ) respectively represent the number n1 of nodes of the natural uranium region at the upper end region of the fuel assembly and the number n2 of the nodes of the natural uranium region at the lower end region of the fuel assembly.

In the enriched uranium region of the fuel assembly embodying the present invention, the average enrichment is highest in the middle section, medium in the lower section and lowest in the upper section. The average enrichment of the portion of the middle section above the level of the upper end of the effective fuel zone of the part length fuel rod is smaller than that of the portion of the middle section below the level of the upper end of the effective fuel zone of the part length fuel rod.

In the fuel assembly in accordance with the present invention, the average enrichment is higher in the middle section than in the lower section. According to this arrangement, a more uniform axial distribution of power is obtained and, at the same time, increase in the power peaking to increase in mis-match of power levels among fuel assemblies due to enhancement in the exposure is suppressed. The resultant margin of the power peaking can be used for other peaking which contribute to improvement in the fuel economy. In order to attain uniform or even power distribution along the axis of the fuel assembly, it is necessary that the boundary between the middle section having greater enrichment and the lower section having smaller enrichment has to be positioned within the range between $1/3$ and $7/12$ of the effective fuel length H as measured from the lower end of the effective fuel zone.

The part length fuel rods are not disposed in the outermost portion of the matrix of fuel rods constituting the fuel assembly but in portions where the local power peaking are comparatively low. The part length fuel rod therefore has an enrichment level lower than that of the average enrichment over the whole fuel assembly. Therefore, as stated before, the average enrichment of the portion of the middle section above the level of the upper end of the effective fuel zone of the part length fuel rod is slightly smaller than that of the portion of the middle section below the level of the upper end of the effective fuel zone of the part length fuel rod. It is to be noted, however, the average enrichment of the portion of the middle section above the level of the upper end of the effective fuel zone of the part length fuel rod is greater than that of the lower section.

The provision of the upper section which has the smallest average enrichment among the three sections of the enriched uranium region is intended to effectively lower the average enrichment over the entire fuel rod by making efficient use of a reactivity gain which is offered as a result of reduction in the burnable poison concentration in the upper section and also to improve the reactor shut down margin. That is to say, the neutron importance is smaller in the upper section and therearound than in other sections of the enriched uranium region, so that a greater reduction in the enrichment can be set in the upper section for a given reactivity gain than in other sections. This enables the total amount of uranium to be reduced. Furthermore, in the cold state of the reactor in which the reactor shut down margin is minimum, the neutron flux density is higher in the upper section than in other section. By setting the average enrichment in the upper section to a level lower than those in other sections of the enriched uranium region, it is possible to reduce the reactivity in the reactor core so as to improve the reactor shut down margin.

Figure 4:
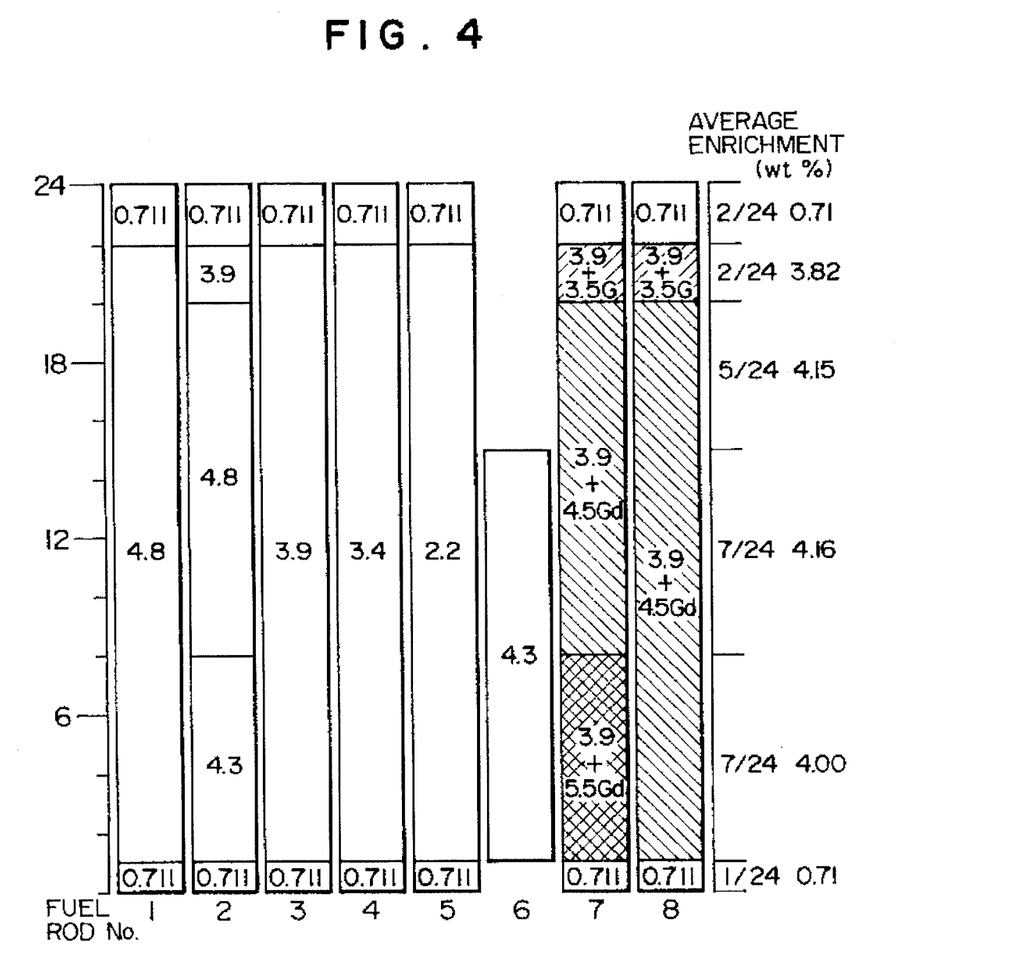
FIG. 4 is an illustration of axial distributions of enrichment and gadolinia contents in fuel rods incorporated in the fuel assembly shown in FIG. 2.

In the fuel assembly in accordance with the present invention, the difference in the average enrichment between the middle section and the lower section is smaller than that between the middle section and the upper section. More specifically, the difference in the average enrichment between the portion of the middle section below the level of the upper end of the effective fuel zone of the part length fuel rod and the lower section is smaller than the difference in the average enrichment between the portion of the middle section above the level of the upper end of the effective fuel zone of the part length fuel rod and the upper section of the enriched uranium region. Thus, the fuel assembly in accordance with the present invention has such an average enrichment distribution that the average enrichment is high in the lower section as compared with the fuel assemblies shown in FIGS. 1 and 2 of Japanese Patent Publication No. 3-78954 in which the average enrichment in the lower section is equal to that in the upper section. The fuel assembly of the present invention has the 9×9 matrix arrangement of fuel rods, thus exhibiting greater thermal margin than the conventional 8×8 fuel assemblies. In the fuel assembly of the present invention, the increase in the axial power peaking within this surplus thermal margin is achieved by increasing the average enrichment in the lower section as compared with that in the conventional 8×8 fuel assembly. This difference will be clear also from the fact that the difference in the average enrichment between the middle section and the lower section in the fuel assembly of an embodiment of the invention, e.g., 0.16% as shown in FIGS. 3 and 4, is smaller than those of the known fuel assemblies disclosed in Japanese Patent Publication No. 3-78954 and U.S. Pat. No. 5,198,186 (in both cases, the difference is 0.20% in the fuel assemblies shown in FIGS. 1 and 2). Thus, the fuel assembly embodying the present invention offers a greater fuel economy over the known fuel assemblies. The lower section of the enriched uranium region inherently has a low void fraction and, hence, a large effect of neutron moderation by coolant. The increase in the content of the fissile material in this lower section provides an increase in the axial peaking of the power. Thus, the axial power distribution of the fuel assembly is such that a slight peak of the power appears in the lower section. The increase in the average enrichment in the lower section where the power peak exists serves to increase the neutrons utilization factor and, hence, an increase in the reactivity in this section, thus contributing to improvement in the fuel economy. The increase in the neutron utilization factor means that a comparatively greater power is obtained with a comparatively low amount of fissile material, which enables the average enrichment over the whole fuel assembly to be reduced, thus offering saving of uranium.

Since the axial power distribution in the beginning period of the operation cycle is such that a power peak appears in the lower section, void fraction is increased in the upper part of the fuel assembly so as to cause accumulation of plutonium in upper part of the fuel assembly in the beginning of the operation cycle. In later half part of the operation cycle, the accumulated plutonium is burnt so that the axial power peak appears in the upper part of the fuel assembly. Thus, a greater spectrum shift effect is produced to improve the fuel economy.

The above-described axial distribution of enrichment in the fuel assembly embodying the present invention is achieved by the use of the large-diameter water rods and part length fuel rods. Thus, the invention affords a greater fuel exposure with a reduced increment in the average enrichment.

In the fuel assembly embodying the present invention, the degree of flatting of the axial power distribution is slightly inferior to those shown in Japanese Patent Publication No. 3-78954 and U.S. Pat. No. 5,198,186, because of the slight increase in the axial power peak appearing in the lower section due to the relatively large average enrichment in the lower section. Nevertheless, the required level of flattening of the axial power distribution is obtained thanks to the large average enrichment in the middle section.

(4) Radial distribution of enrichment over cross-section of fuel assembly

The neutron flux density distribution in a fuel assembly tends to be such that the neutron flux density is comparatively high in the portions adjacent the channel box due to presence of water gap around the channel box. In the fuel assembly embodying the present invention, fuel rods having comparatively high levels of average enrichment are disposed to face the channel box so as to increase the rate of utilization of neutrons and, hence, the reactivity of the whole fuel assembly. Thus, in the fuel assembly embodying the present invention, fuel rods having enrichment levels higher than that of the whole fuel assembly are arranged to form the outermost layer of fuel rods in the cross-section of the fuel assembly.

(5) Axial distribution of burnable poison

In general, some of fuel rods incorporated in a fuel assembly for a BWR contain burnable poison in order to adjust the surplus reactivity in the reactor core.

In the upper part of the reactor core, void fraction is high and the neutron spectrum is hard, so that burning of the burnable poison takes place rather slowly. In the fuel assembly embodying the present invention, as shown in FIG. 1B, the concentration of the burnable poison is low in the upper part (upper section) so as to suppress any loss of reactivity due to presence of residual unburnt burnable poison.

Figure 9:
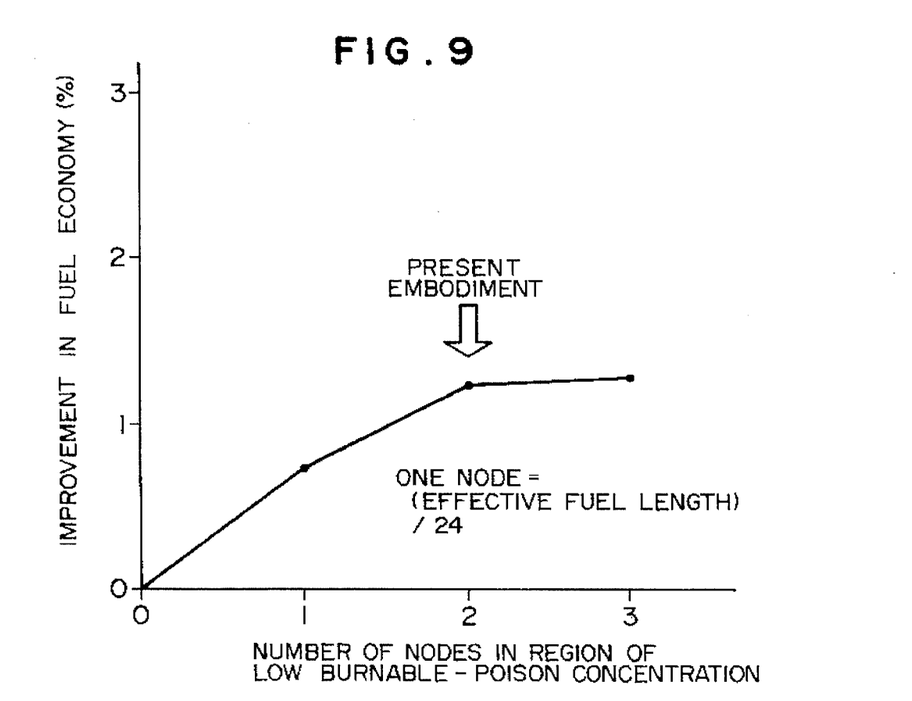
FIG. 9 is a diagram showing the relationship between the axial length of low-gadolinia-concentration region and the fuel economy improving effect.

FIG. 9 shows the relationship between the axial length of the upper section where the concentration of the burnable poison is low and the rate of improvement in the fuel economy. The fuel economy can be increased as the axial length of the upper section is increased. This effect, however, is progressively saturated and, as this length exceeds three nodes, the rise in the fuel economy becomes dull. In one design form of the fuel assembly embodying the present invention, therefore, the axial length of the upper section is determined to be 2 nodes or so.

As shown in FIG. 1B, in the fuel assembly embodying the present invention, the enriched uranium region has three sections having different levels of concentration of burnable poison. The natural uranium regions do not contain burnable poison. The average density level of the burnable poison is lowest in the lower section, medium in the middle section and highest in the upper section. These three sections coincide with the lower section, middle section and the upper section, respectively, of the enriched uranium region discussed before in paragraph (3) in regard to the axial enrichment distribution.

The fuel assembly embodying the present invention exhibit at comparatively low levels of output at the natural uranium regions in the upper and lower parts thereof, due to leakage of neurons. In this fuel assembly, since the natural-uranium regions constituting the upper and ;lower end regions do not contain burnable poison, loss of reactivity due to presence of residual burnable poison can be suppressed in these upper and lower end regions.

Thus, in the fuel assembly embodying the present invention, the concentration of the burnable poison is set to a high level in the lower section as compared with the middle section, in order to minimize the influence of the burning of the burnable poison on the axial power distribution due to difference in the void fraction along the axis of the fuel assembly, whereby the axial power distribution is rendered uniform. This suppresses increase in the power peaking caused by increase in the mismatch among fuel assemblies caused by increase in the fuel burn-up degree. The resultant margin for the power peaking can be used for creating other peaking which are intended to improve the fuel economy.

According to the axial distribution of the burnable poison concentration, the burnable poison can be substantially fully burnt away by the end of the operation cycle.

II. Nuclear reactor

A description will now be given of the outline of a nuclear reactor of the invention having a reactor core loaded with the fuel assemblies embodying the present invention. As is the case of the fuel assembly embodying the present invention, the reactor core of the reactor in accordance with the present invention also is designed for higher fuel economy.

(1) Loading of high-burn-up fuel in the radially outermost region in the core

In the nuclear reactor embodying the present invention, fuel assemblies in which fuel has been burnt to a comparatively high degree of burn-up are disposed in the radially outermost region thereof, whereas, new fuel assemblies and fuel assemblies in which the fuel burn-up degrees are still low are charged in the central region of the reactor core.

Figure 11:
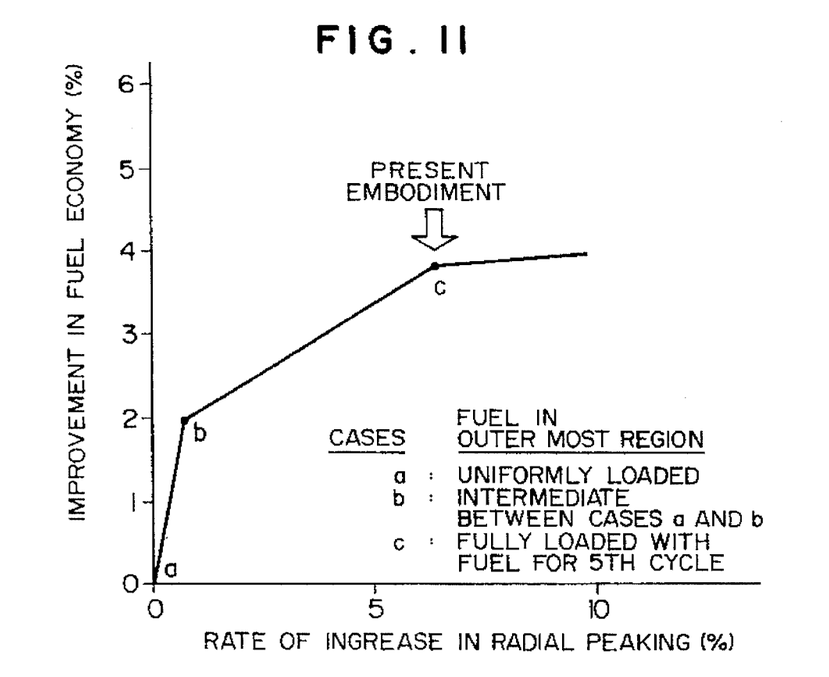
FIG. 11 is an illustration of the relationship between the arrangement of high exposure fuel assemblies in the outermost portion of the reactor core and the fuel economy improvement effect.

Thus, the amount of fissile material, e.g., U-235, can be increased in the central region where the neutron flux density is comparatively high. This effect, in combination with the effect to suppress the leakage of neutrons to the exterior of the reactor core, makes it possible to enhance the reactivity in the reactor core. Relationship between the fuel economy and the power peaking presented by a variety of patterns of loading of fuel assemblies in the radially outermost region in the core is shown in FIG. 11.

(2) TWO different types of fuel assemblies having different levels of burnable poison concentration The core of the nuclear reactor embodying the present invention employs two types of fuel assemblies having different amounts of burnable poison per assembly. It is possible to adjust the reactivity in the reactor core by varying the ratio between the numbers of these to types of fuel assemblies in such a manner as to make a good use of the difference in the reactivities between two types of fuel assemblies exhibited until the burnable poison is burnt away. It is therefore possible to easily control the reactivity in the reactor core to cope with a demand for operating conditions such as the time period of operation of the nuclear reactor.

The nuclear reactor of the present invention also permits an adequate control of the surplus reactivity by the control rods during operation of the reactor. At the same time, the number of the control rods employed in the running of the reactor can be minimized, requiring reduced renewal of the control rods.

Gadolinia, which is one of burnable poisons, has a large thermal neutron absorption cross-sectional area. Most of the neutrons are absorbed by the surfaces of the gadolinia-containing fuel rods. It is therefore possible to control the rate of absorption of neutrons by changing the number of the gadolinia-containing fuel rods. At the same time, an effective period of absorption of neutrons by the gadolinia-containing fuel rods can be adjusted by changing the amount or concentration of gadolinia on such gadolinia-containing fuel rods.

(3) Control cell

In the reactor embodying the present invention, fuel assemblies of high burn-up, i.e., fuel assemblies in which the amounts of the fissile material are comparatively low, are used as the four fuel assemblies which surround each of the control rods which are inserted into the reactor core for the purpose of control of the reactor power. These four fuel assemblies together with the control rod form a control cell. The four fuel assemblies in each control cell have low levels of reactivity and, hence, low levels of assembly power. Therefore, even when the linear power generation ratio is increased due to extraction of the control rod after a long stay in the control cell, the level of the linear power generation ratio reached as a result of the extraction is still lower than the operational limit value.

Figure 10:
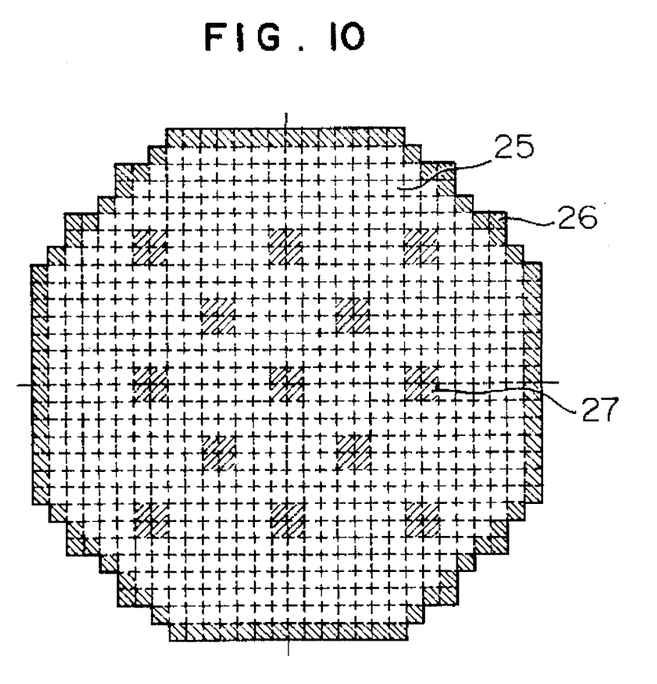
FIG. 10 is a schematic illustration of the reactor core of a nuclear reactor in accordance with the present invention.

FIG. 10 illustrates the concept of the nuclear reactor embodying the present invention. Numeral 25 denotes fuel assemblies, 26 denotes fuel assemblies which have been burnt to certain degrees of burn-up and 27 denote control cells.

Figure 2:
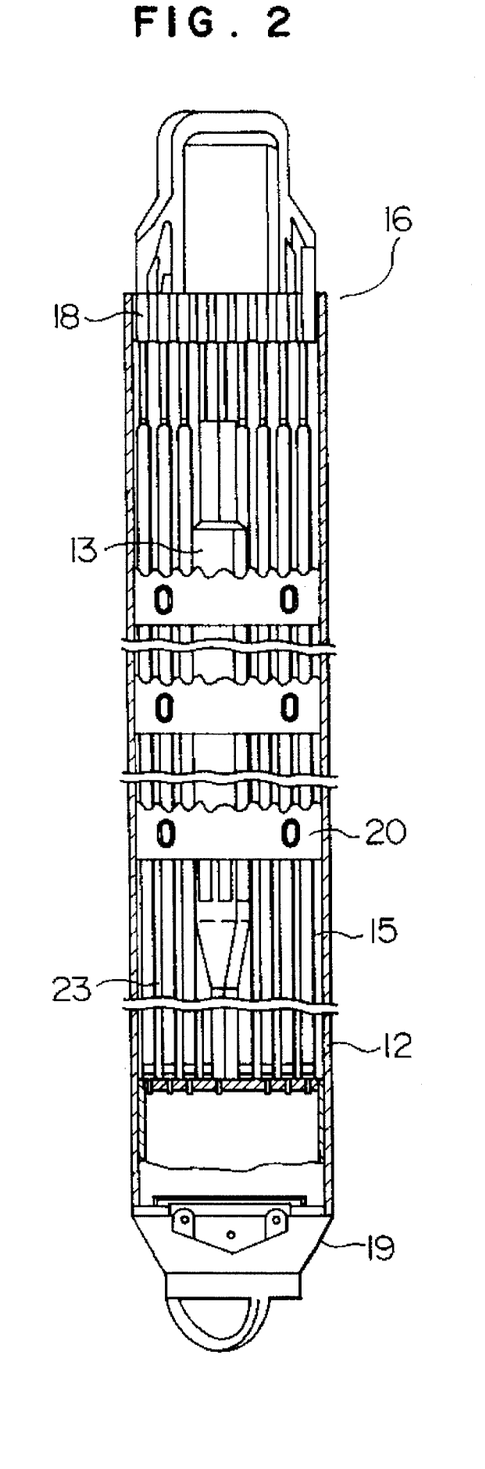
FIG. 2 is a longitudinal sectional view of a preferred embodiment of a fuel assembly in accordance with the present invention.

An embodiment of the fuel assembly in accordance with the present invention will be described with reference to FIGS. 1 to 3. The fuel assembly of this embodiment, denoted by 16, is a 9×9 fuel assembly intended for use in a BWR. The fuel assembly 16 comprises upper and lower tie plates 18 and 19, a plurality of fuel rods 15 and a plurality of water rods 13, the fuel rods 15 and the water rods 13 being held at their upper and lower ends by the upper and lower tie plates 18, 19. A plurality of fuel spacers 20 arranged in the axial direction of the fuel assembly 16 hold the fuel rods so as to maintain the required spacing between adjacent fuel rods 15. Similarly, the water rods 13 are held and spaced from each other by the fuel spacers 20. The fuel rods 15 bundled by the fuel spacers 20 are surrounded by a channel box 12 which is secured to the upper tie plate 18. A channel fastener (not shown) is secured to the upper tie plate 18 at the same side as the control rod which is denoted by 14.

Although not illustrated, the fuel rod 15 has a clad tube charged with a multiplicity of fuel pellets and closed at its upper and lower ends with plugs. The fuel pellet comprises UO2 as a fuel material and contains U-235 as the fissile material. Fuel pellets are compacted downward by the force of a spring charged in the gas plenum in the clad tube.

There are two water rods 13 which are arranged in the central region of the cross-section of the fuel assembly substantially along a diagonal line of the cross-section. As stated in Paragraph 1-(1) before, these fuel rods occupies an area which can accommodate seven fuel rods. The outside diameter of the water rod 13 is greater than the pitch at which the fuel rods 15 are arranged, and the diameter of each water rod is so large as to occupy an area which can accommodate three-and-a-half fuel rods. The diameter of the water rod, however, is reduced at a lower end portion of the water rod below the lowermost fuel spacer 20, in order to prevent bending stress in the lower end portion of the water rod from becoming excessively large in the event of, for example, earthquake. Each water rod is hollow to define a passage for non-boiling water. By using these water rods 13, the water-to-fuel ratio is increased as compared with the conventional fuel assemblies, thereby preventing deterioration in the core characteristics while improving reactivity.

The control rod 14 has a cross-shape cross-section. One control rod 14 is used in combination with every four fuel assemblies. There are two types of reactor core: namely, a reactor core referred to as "D lattice core" in which the width of the water gap formed on the side wall of the fuel assembly facing the inserted control rod is greater than the width of the water gap on the side wall of the fuel assembly opposite to the control rod; and a reactor core referred to as "C lattice core" in which the width of the water gap formed on the side wall of the fuel assembly facing the inserted control rod is equal to the width of the water gap on the side wall of the fuel assembly opposite to the control rod.

The illustrated fuel assembly 16 is intended to be loaded in a C lattice core. The fuel assembly includes eight types of fuel rods 1 to 8 as indicated in FIG. 4. These fuel rods 1 to 8 are arranged in the cross-section of the fuel assembly within the channel box 12 in a manner shown in FIG. 3. The fuel rods indicated at 6 are part length fuel rods while other fuel rods are full length fuel rods.

Each of the full length fuel rods designated at 1 to 5, 7 and 8 has regions charged with natural uranium, i.e., natural uranium blanket regions, at the upper and lower end regions of its effective fuel zone. The axial overall length of the effective fuel zone of each such long fuel rod is equal to the effective fuel length H mentioned before. The upper natural uranium blanket region extends downward from the top end of the effective fuel zone over a length of 2/24 the effective fuel length H, while the lower natural uranium blanket region extends upward from the bottom end of the effective fuel zone over a length corresponding to 1/24 the effective fuel length. Thus, the axial lengths of the natural uranium blanket regions in the illustrated embodiment provides the combination (2/1) of the axial lengths which, as explained before in connection with FIG. 8, provides optimum effect in improvement in the fuel economy. The part length fuel rod 6 does not have any natural uranium blanket region. The effective fuel zone of the part length fuel rod 6 is within the range of from 1/24 to 15/24 of the effective fuel length H as measured from the bottom end of the effective fuel zone of the full length fuel rod.

In each of the full length fuel rods 1 to 5, 7 and 8, the region between 1/24 and 22/24 of the effective fuel length H as measured from the lower end of the effective fuel zone constitutes an enriched uranium region which is charged with fuel enriched in uranium. In each of the full length fuel rods 1, 3 to 5, 7 and 8, the enrichment is uniform over the entire axial length of the enriched uranium region, as shown in FIG. 4, whereas in the full length fuel rod 2, the enriched uranium region has three sections having different levels of enrichment, as shown in the same Figure. The enriched uranium region of the part length fuel rod has a uniform distribution of enrichment over the entire axial length thereof. The enrichment levels in the enriched uranium regions are: 4.8 wt % in the fuel rod 1, 3.9 wt % in the fuel rods 3, 7 and 8, 3.4 wt % in the fuel rod 4, 2.2 wt % in the fuel rod 5 and 4.3 wt % in the fuel rod 6. In the enriched uranium region of the fuel rod 2, the lower section extending from a point of 1/24 to a point of 8/24 of the effective fuel length H as measured from the bottom of the effective fuel zone has an enrichment of 4.3 wt %, the middle section between the point of 8/24 to the point of 20/24 has an enrichment of 4.8 wt %, and the upper section extending between the point of 20/24 to the point of 22/24 has enrichment of 3.9 wt %.

Each of the fuel rods 7 and 8 contains gadolinia as the burnable poison, in its fuel pellets which are disposed in the enriched uranium region. The fuel rod 7 has such an axial gadolinia concentration distribution that the gadolinia content is 5.5 wt % in the section which extends from a point of 1/24 to the point of 8/24 of the effective fuel length H as measured from the bottom end of the effective fuel zone, 4.5 wt % in the section extending between the point of 8/24 and the point of 20/24 and 3.5 wt % in the section which extends from the point of 20/24 to the point of 22/24. The fuel rod 8 has such an axial gadolinia concentration distribution that the gadolinia content is 4.5 wt % in the section which extends from a point of 1/24 to the point of 20/24 of the effective fuel length H as measured from the bottom end of the effective fuel zone and 3.5 wt % in the section extending between the point of 20/24 and the point of 22/24. Fuel rods 1 to 6 do not contain gadolinia.

The fuel rods 1 to 8 having different axial enrichment distributions as described are arranged in the manner shown in FIG. 3, so that the whole fuel assembly 16 exhibits such an axial distribution of average enrichments across the cross-section that the average enrichment is 4.00 wt % in the lower section extending between a point of 1/24 to the point of 8/24 of the effective fuel length H as measured from the bottom end of the effective fuel zone of the fuel assembly 16, 4.16 wt % in the middle section which is between the point of 8/24 and the point of 20/24 and 3.82 wt % in the upper section which extends from the point of 20/24 to the point of 22/24. The middle section is divided into two portions: namely, a portion which is above the level of the top end of the effective fuel zone of the part length fuel rod 6 and a portion which is below the same. These portions therefore will be referred to as an upper middle section and a lower middle section, respectively. In the illustrated embodiment, the upper middle section has an average enrichment of 4.15 wt % across the cross-section of the fuel assembly, while the lower middle section has an average enrichment of 4.16 %. The value of 4.16 wt % mentioned above as the value of the average enrichment of the whole middle section has been obtained by rounding the value of the third decimal place. The average enrichment across the cross-section of the fuel assembly in each of the upper and lower natural uranium blanket regions is 0.71 wt %. The average enrichment over the entire fuel assembly 16 is 3.70 wt %. The fuel assembly having the described axial enrichment distribution provides the advantages discussed before in Paragraph 1-(3). In this embodiment, although the average enrichment is increased, the water-to-fuel ratio can adequately be increased by virtue of use of the pair of fuel rods, this realizing the advantage stated in the foregoing Paragraph 1-(1). Furthermore, the described embodiment employs only one type of such a kind of fuel rod that has upper, middle and lower sections having different levels of enrichment in the enriched uranium region, so that the number of the types of fuel rods is reduced to realize a simple reactor core construction while facilitating production and preparation of the fuel assemblies.

In BWR, the void fraction is increased towards the upper end of the reactor core, so that the density of the coolant (water) as the moderator is smaller in the upper part of the reactor core. Therefore, loading of fuel assemblies having uniform axial enrichment distribution in the reactor core tends to crate such an axial power distribution that a peak of the power appears in a lower part of the fuel assemblies. This tendency is enhanced due to the use of the part length fuel rods in the fuel assembly 16 because the part length fuel rods provides a greater amount of charging of the fuel material in the lower part of the fuel assembly than in the upper part of the same. In order to overcome this problem, in the present invention, the enrichment is set to a higher level in the middle section than in the lower section, so as to flatten or uniformalize the axial distribution of the power. The aforesaid two conditions or requirements, namely, the difference in the average enrichment between the mid section and the lower section being 0.16 wt % and the boundary between the middle and lower sections being at the point of 8/24 of the effective fuel length H from the bottom of the effective fuel zone have been determined to provide an effect of flattening or uniformalizing the axial power distribution to a level which meet the design requirements.

The fuel assembly 16 has fourteen gadolinia-containing fuel rods. In such fuel rods, the gadolinia concentration is lowest in the lower section, medium in the middle section and highest in the upper section. The difference in the gadolinia content between the lower and middle sections is about 0.5 wt % as a mean. As stated before, in a BWR, the void fraction increases towards the upper end of the reactor core so that the density of the coolant as the moderator is lower in the upper part of the reactor core than in the lower part of the same. Therefore, the neutron spectrum is softer in the lower part of the reactor core than in the upper part, so that the burning of gadolinia proceeds more rapidly in the lower part than in the upper part of the reactor core. This tends to accelerate the rise of the reactivity in the lower part of the reactor core, promoting the power peaking in this part of the core. In the described embodiment of the invention, therefore, the gadolinia concentration i increased in the lower section so as to achieve an adequate control of the rate of rise of the reactivity. The range of the difference in the gadolinia concentration has been determined so as to optimize the effect of flattening of the axial power distribution. The described embodiment employs two types of gadolinia-containing fuel rods, so as to realize a difference in the gadolinia content of about 1 wt % or greater within the same fuel rod, in order to meet a requirement from the view point of fabrication of the fuel.

In the fuel assembly 16, the average enrichment across the cross-section is lower in the upper section of the enriched uranium region than in the middle and lower sections of the same. The upper section of the lowest average enrichment corresponds to the regions in the fuel rods 7 and 8 where the concentrations of the burnable poison are low, thus compensating for the reduction in the reactor shut down margin. The aforesaid axial length of the upper section, i.e., 3/24 the effective fuel length H, has been determined to optimize the effect of improving fuel economy produced, as will be described later, by a reduction in the amount of the burnable poison.

As stated before, the fuel assembly 16 has fourteen gadolinia-containing fuel rods. In each of the fuel rods 7 and 8 in this fuel assembly 16, the gadolinia concentration per unit axial length is so valid along the axis that it is higher in the upper section of the enriched uranium region than in other underlying, i.e., the middle and lower sections, of the enriched uranium region, whereby improved fuel economy is achieved as shown in FIG. 9. The point indicated as "the point in accordance with the invention" shows the effect of improvement in the fuel economy as achieved by the reduction in the amount of gadolinia in the fuel assembly 16.

The fuel assembly has, in the radially outermost region of its cross-section, fuel rods 2 and 3 having regions of enrichment levels higher than the average enrichment over the whole fuel assembly. This arrangement offers the advantage of reactivity gain as stated before in the foregoing Paragraph 1-(4).

The fuel assembly 16 as described offers a remarkable improvement in the fuel economy. More specifically, the fuel assembly makes it possible to enhance the exposure, e.g., to a level of 45 GWd/t in terms of discharge exposure, with minimal increment of the average enrichment, while preserving sufficiently large values of the thermal margin in the reactor core and the reactor shut down margin. This remarkably reduced the fuel cycle cost, as well as the demand for disposal of used fuel assemblies.

Figure 5:
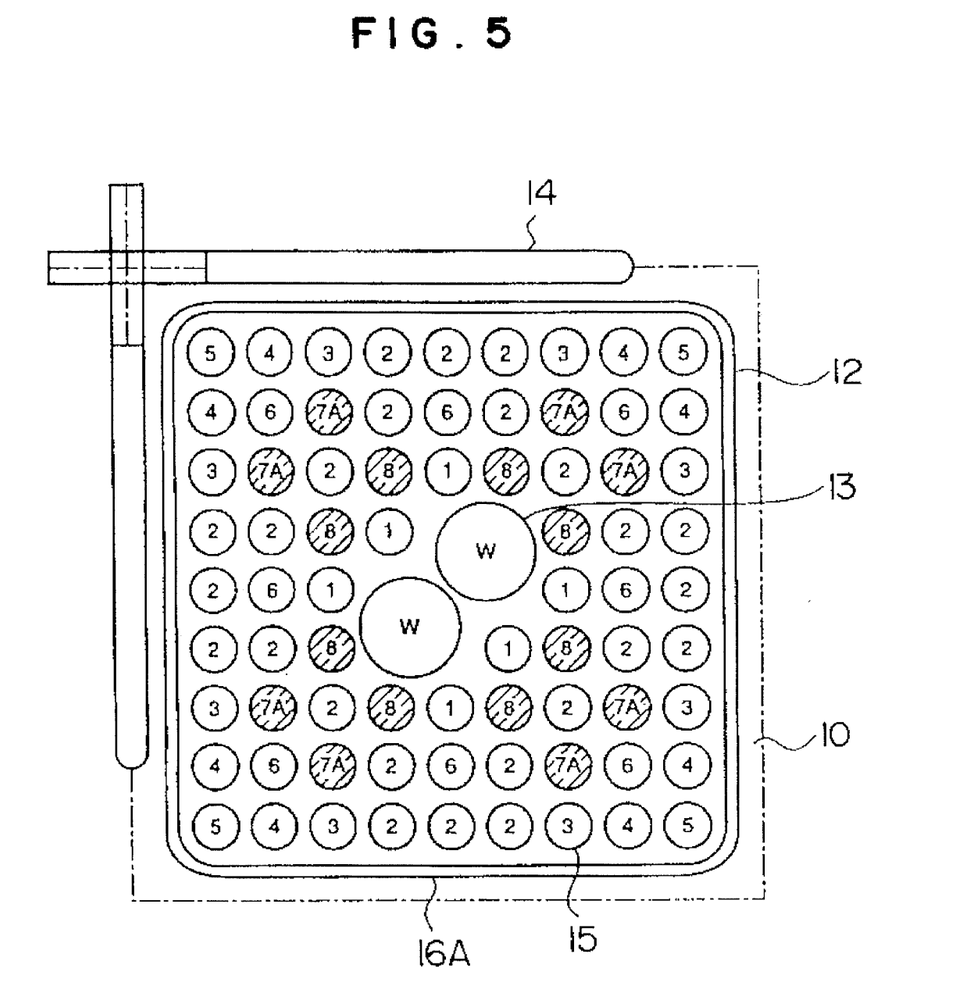
FIG. 5 is a cross-sectional view of another embodiment of the fuel assembly in accordance with the present invention.
Figure 6:
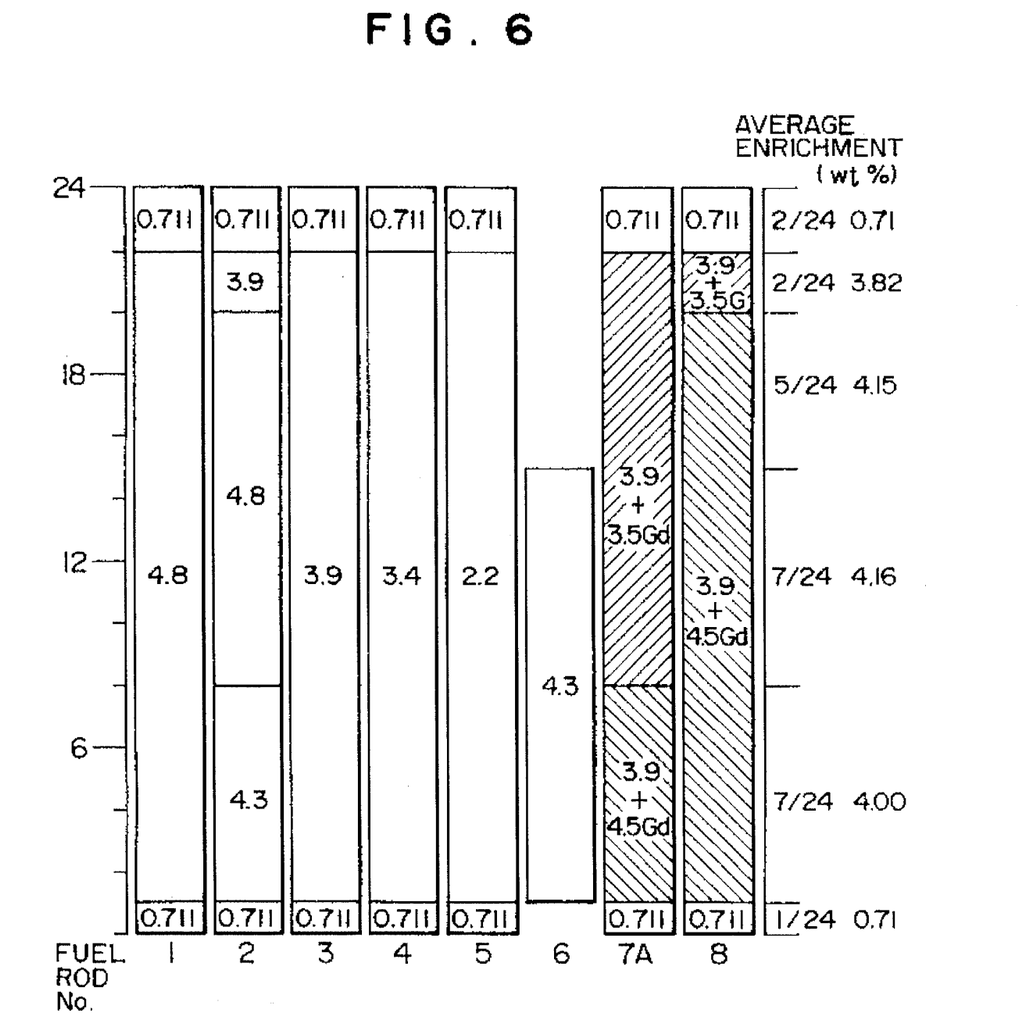
FIG. 6 is an illustration of axial distributions of enrichment and gadolinia contents in fuel rods incorporated in the fuel assembly shown in FIG. 5.

Another embodiment of the fuel assembly in accordance with the present invention will be described with reference to FIGS. 5 and 6. This embodiment of the fuel assembly, denoted by 16A, is basically the same in the construction as the fuel assembly 16, and is intended for use in a C lattice core as is the case of the fuel assembly 16. The types of the fuel rods 1 to 6 and 8 used in this fuel assembly 16A are the same as those in the fuel assembly 16, but the fuel assembly 16A employs a fuel rod 7A in place of the fuel rod 7 in the fuel assembly 16. The fuel rod 7A has a uniform axial enrichment distribution throughout its enriched uranium region. Namely, the enrichment is set substantially constant to a value of 3.9 wt % throughout the enriched uranium region. However, the gadolinia concentration in the enriched uranium region of this fuel rod 7A is so varied along the axis that the gadolinia concentration is 4.5 wt % within the range of from 1/24 to 8/24 of the effective fuel length H as measured from the bottom of the effective fuel zone and 3.5 wt % in the range of from 8/24 to 22/24 of the effective fuel length H.

The axial enrichment distribution in the fuel assembly 16A is the same as that in the fuel assembly 16.

The fuel assembly 16A has sixteen gadolinia-containing fuel rods. The average gadolinia concentration of the 16 gadolinia-containing fuel rods is so valid along the axis that the average concentration is lowest in the lower section, medium in the middle section and highest in the upper section. A difference in the average gadolinia concentration of about 0.5 wt % is set between the lower section and the middle section.

The fuel assembly 16A offers the same advantages as those presented by the first embodiment 16 of the fuel assembly.

The fuel assembly has fourteen gadolinia-containing fuel rods, while the fuel assembly 16A has sixteen. In each of these fuel assemblies, a difference in the gadolinia concentration is posed between the middle and lower section of the enriched uranium region: more specifically, the gadolinia concentrations are 4.5 wt % and 5.5 wt %, respectively, in the middle and lower sections of the fuel assembly 16, and 3.5 wt % and 4.5 wt %, respectively, in those sections in the fuel assembly 16A. By loading these two types of fuel assemblies 16, 16A in the core of the reactor, it is possible to adequately control the reactivity in the core to cope with demand for variation in the operating condition such as a change in the time period of operation and to obtain reactor core characteristics with sufficient safety margin.

Figure 7:
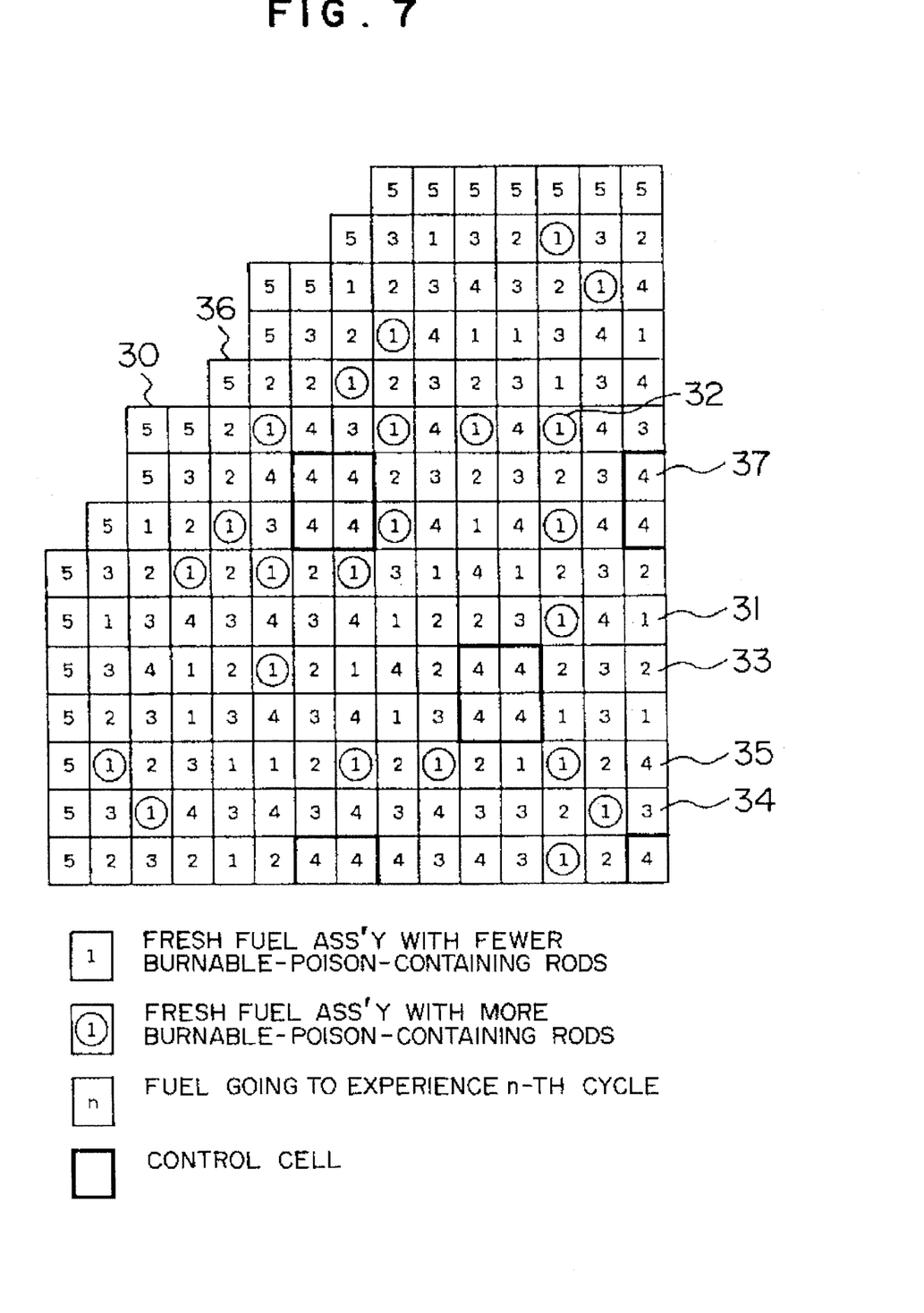
FIG. 7 is a horizontal cross-sectional view of the core of a BWR as a preferred embodiment of the nuclear reactor in accordance with the present invention, showing a quarter part of the cross-section.

A boiling water reactor as an embodiment of the nuclear reactor of the invention will be described with reference to the drawings. The boiling water reactor has a reactor core 30 as shown in FIG. 7. The core 30 is of the C lattice type. Only a quarter part of the cross-section of the core is shown in FIG. 7. There are many squares shown in FIG. 7 each of which represents a unitary fuel assembly. Numerals 1 to 5 allocated to the squares show the periods of stay of the fuel assemblies in the BWR reactor core. Thus, the fuel assemblies indicated at numeral 1 are going to experience the first cycle of operation, while the fuel assemblies indicated at 2 are going to experience the second cycle of operation. Similarly, fuel assemblies indicated at numerals 3 and 4 are going to be subjected to the third and fourth cycles of operation. The term "operation cycle" or "fuel cycle" is used to mean a predetermined period between the startup of the BWR after a shuffling or renewal of the fuel assemblies and the shutoff of the BWR for the next shuffling or renewal of the fuel assemblies. Thus, the fuel assemblies which have experienced greater numbers of cycles have greater degrees of burn-up.

The fuel assemblies 31, represented by squares indicated at "1", are fresh fuel assemblies. The fuel assemblies 16 having fewer gadolinia-containing fuel rods are used as these fresh fuel assemblies 31. The fuel assemblies 32, represented by squares indicated at "(1)", are also fresh fuel assemblies. The fuel assemblies 16A having greater number of gadolinia-containing fuel rods than the fuel assemblies 16 are used as these fresh fuel assemblies 32. The fuel assemblies 33 to 36 have experienced more than one cycle of operation and, hence, gadolinia in their fuel assemblies have been consumed away. Some of the fuel assemblies 35 are used as the fuel assemblies which, together with a control rod surrounded by them, form a control cell 37. The control cells 37 are provided for the purpose of facilitating the operations of the control rods which are conducted to control the power and the reactivity in the BWR during the operation of the latter.

The fuel assemblies 36 which have been burnt up to a high degree and, hence, having low content of U-235, are disposed in the radially outermost region of the cross-section of the reactor core 30, whereas the fuel assemblies 31 And 32 which have high contents of U-235 are disposed in the radially central region of the cross-section of the reactor core. This type of reactor core 30 offers the advantage discussed before in Paragraph 2-(2). FIG. 11 shows the relationship between the proportion of the number of the fuel assemblies 36 of high-burn-up arranged in the radially outermost region of the cross-section of the reactor core and the extent of improvement achieved in the fuel economy. More specifically, in FIG. 11, a point "a" provides, as a reference, the level of the fuel economy as obtained when the reactor core 30 is fully loaded with the fuel assemblies 36 which are going to experience the fifth cycle, while a point "c" shows the level of the fuel economy as attained when the fuel assemblies are positioned only in the radially outermost region of the cross-section of the reactor core. A point "b" indicates an intermediate case, i.e., the case where the proportion of the number of the fuel assemblies 36 is between the cases indicated by the points "a" and "c". It will be seen that the rate of increase in the power peaking increases, but the rate of improvement in the fuel economy decreases, as the proportion of the number of the fuel assemblies disposed in the radially outermost region is increased. Therefore, in the illustrated embodiment of the invention, the radially outermost layer of the fuel assemblies in the cross-section of the reactor core 30 is constituted by the fuel assemblies 36, i.e., in conformity with the case "c" described above.

In the illustrated BWR embodying the present invention, the advantages stated before in paragraph 2-(2) are achieved by virtue of the fact that the fuel assemblies 36 which have comparatively high degrees of burn-up are disposed near the outer peripheral portion of the reactor core 30. That is, an adaptability to change in the operation period of the BWR is enhanced and a reactivity gain is obtained.

As will be understood from the foregoing description, according to the present invention, it is possible to enhance the exposure of the fuel assemblies with minimal increment of the average enrichment, while preserving sufficiently large values of safety margins such as the thermal margin of the reactor and the reactor shut down margin. This remarkably increases the energy extractable per fuel assembly, leading to a remarkable improvement in the fuel economy.

What is claimed is:

1. A fresh fuel assembly for loading in a nuclear reactor, charged with uranium and no plutonium and having a plurality of fuel rods and at least one water rod surrounded by said fuel rods, said fuel assembly comprising:

a fuel-charged zone including axially upper and lower end regions charged with natural uranium and an enriched uranium region between said upper and lower end regions, said enriched uranium region having three sections of an upper section, a middle section and a lower section of different levels of enrichment;

said middle section having an average enrichment of a level higher than an average enrichment level of said upper and lower sections;

a difference in the average enrichment level between said middle section and said lower section being smaller than a difference in the average enrichment level between said middle section and said upper section;

wherein the fuel assembly comprises said fuel rods arranged in nine columns and nine rows;

wherein a pair of water rods are disposed adjacent to each other in a central portion of the cross-section of said fuel assembly so as to occupy an area substantially equal to an area to be occupied by seven fuel rods;

wherein a part of said plurality of fuel rods comprises burnable-poison-containing fuel rods containing uranium and a burnable poison and the rest of said plurality of fuel rods comprises uranium fuel rods containing uranium and no burnable poison;

wherein a part of said uranium fuel rods have axially upper and lower end regions charged with natural uranium, and an enriched uranium region between said upper and lower end regions, said enriched uranium region having three sections of an upper section, a middle section and a lower section of different levels of enrichment, said middle section having an enrichment of a level higher than an enrichment level of said upper and lower sections, a difference in enrichment level between said middle section and said lower section being smaller than a difference in enrichment level between said middle section and said upper section; and wherein a burnable poison content per unit axial length in the upper section of each burnable-poison-containing fuel rod is smaller than a burnable poison content per unit axial length in other sections of said enriched uranium region of the burnable-poison-containing fuel rod.

2. A fresh fuel assembly according to claim 1, wherein said uranium fuel rods include first fuel rods, second fuel rods having an axial length shorter than an axial length said first fuel rods, the uranium fuel rods having said three sections, in said uranium region, of different levels of enrichment are included in said first fuel rods and not in said second fuel rods, the upper end of the nuclear-fuel-charged zone in each said second fuel rod being located within said middle section, the average enrichment, as viewed in the cross-section of the fuel assembly, of the portion of said middle section above said upper end of the fuel-charged zone in each second fuel rod being smaller than the average enrichment of the portion of said middle section below said upper end of the fuel-charged zone of said second fuel rods.

3. A fresh fuel assembly according to claim 2, wherein the difference in the average enrichment, said viewed in the cross-section of the fuel assembly, between the portion of said middle section below the upper end of said fuel-charged zone of said second fuel rod and said lower section thereof is lower than the difference in the average enrichment between the portion of said middle section above said upper end of the fuel-charged zone of said second fuel rod and said upper section thereof.

4. A fresh fuel assembly according to claim 2, wherein the enrichment of said enriched uranium region of said second fuel rod is higher than the average enrichment of the whole fuel assembly.

5. A fresh fuel assembly according to claim 4 wherein the content of the burnable poison per unit axial length is smallest in said upper section, medium in said middle section and greatest in said lower section.

6. A fresh fuel assembly according to claim 1, wherein said uranium fuel rods include first fuel rods, second fuel rods having axial lengths shorter than an axial length of said first fuel rods, said first fuel rods including a plurality of kinds of uranium fuel rods each having upper and lower end regions charged with natural uranium and an intermediated enriched uranium region of a uniform axial enrichment distribution, and one kind of uranium fuel rods each having upper and lower end regions charged with natural uranium and an intermediate enriched uranium region composed of three sections of different levels of enrichment, the uranium fuel rods having said three sections of different enrichment levels being disposed in the outermost layer of fuel rods at portions between adjacent corners of the fuel assembly, as viewed in the cross-section of the fuel assembly, and other portions of the outermost layer of fuel rods, as viewed in the fuel assembly cross-section, being constituted by the first fuel rods having the uniform axial enrichment distributions in said enriched uranium regions.

7. A fresh fuel assembly according to claim 1, wherein the axial length of the natural uranium regions ranges from 1/24 to 1/12 of the axial length of the whole fuel-charged zone.

8. A fresh fuel assembly according to claim 1, wherein the axial length of said upper section of said enriched uranium region ranges from 1/12 to 1/8 of the axial length of the whole fuel-charged zone.

9. A fresh fuel assembly according to claim 1, wherein the boundary between said lower section and said middle section is positioned within the range between 1/3 and 7/12 of the axial length of the whole fuel-charged zone as measured from the lower end of said fuel-charged zone.

10. A fresh fuel assembly according to claim 1, wherein fuel rods having higher enrichment than the average enrichment over the whole fuel assembly are disposed to form the outermost layer of fuel rods in the cross-section of the fuel assembly.

11. A fresh fuel assembly according to claim 1, wherein the rest of said uranium fuel rods includes at least one uranium fuel rod having axially upper and lower end regions charged with natural uranium and an enriched uranium region of an enrichment level substantially uniform axially thereof.

12. A nuclear reactor having a reactor core, said reactor core comprising:

a first fuel assembly having a plurality of fuel rods charged with a nuclear fuel material and arranged in nine columns and nine rows and a pair of water rods which are arranged adjacent to each other at the central portion of the cross-section of said first fuel assembly and occupying an area which can accommodate seven fuel rods, said first fuel assembly containing a burnable poison; and a second fuel assembly having a plurality of fuel rods charged with a nuclear fuel and arranged in nine columns and nine rows and a pair of water rods which are arranged adjacent to each other at the central portion of the cross-section of said second fuel assembly and occupying an area which can accommodate seven fuel rods, said second fuel assembly containing a burnable poison of an amount greater than an amount of said burnable poison contained in said first fuel assembly;

wherein a part of said plurality of fuel rods of said first and second fuel assemblies comprises burnable-poison-containing fuel rods containing uranium and a burnable poison and the rest of said plurality of fuel rods comprises uranium fuel rods containing uranium and no burnable poison;

wherein each of said first and second fuel assemblies before loading in the nuclear reactor is charged with uranium and no plutonium and comprises a fuel-charged zone including axially upper and lower end regions charged with natural uranium, and an enriched uranium region between said upper and lower end regions, said enriched uranium having an upper section, a middle section and a lower section of different enrichment;

said middle section having average enrichment of a level higher than an average enrichment level of said upper and lower sections;

a difference in the average enrichment level between said middle section and said lower section being smaller than a difference in the average enrichment level between said middle section and said upper section;

wherein a part of said uranium fuel rods has axially upper and lower end regions charged with natural uranium, and an enriched uranium region between said upper and lower end regions, said enriched uranium region having an upper section, a middle section and a lower section of different levels of enrichment, said middle section having an enrichment of a level higher than an enrichment level of said upper and lower sections, a difference in the enrichment level between said middle section and said lower section being smaller than a difference in the enrichment level between said middle section and said lower section; and wherein a burnable poison content per unit axial length in the upper section of each burnable-poison-containing fuel rod is smaller than a burnable poison content per unit axial length in other sections of said enriched uranium region of the burnable-poison-containing fuel rod.

13. A nuclear reactor according to claim 12, wherein said uranium fuel rods include first fuel rods and second fuel rods having axial lengths shorter than an axial length of said first fuel rods.

14. A nuclear reactor according to claim 12, wherein the content of the burnable poison per unit axial length is the smallest in said upper section, medium in said middle-section and the greatest in said lower section.

15. A nuclear reactor according to claim 12, wherein the average concentration of said burnable poison in said first fuel assembly is greater than in said second fuel assembly.

16. A nuclear reactor according to claim 12, wherein the first and second fuel assemblies which have stayed in the reactor core and burnt are disposed at four positions surrounding each of control rods which are disposed at the outermost portion and central portion of the cross-section of said reactor core.

* * * * *